United States Patent [19]

Bowen et al.

[11] 4,408,353

[45] Oct. 4, 1983

[54] COAXIAL CABLE/FIBER OPTIC BUS NETWORK

[75] Inventors: Terry P. Bowen, Etters; George J. Lawrence, Mechanicsburg; Lawrence G. Wiley, Camp Hill, all of Pa.

[73] Assignee: AMP Incorporated, Harrisburg, Pa.

[21] Appl. No.: 198,029

[22] Filed: Oct. 17, 1980

[51] Int. Cl.³ .............................................. H04B 9/00
[52] U.S. Cl. .................................. 455/608; 455/601; 455/606; 358/901
[58] Field of Search ............... 455/601, 602, 606, 600, 455/608, 607, 612; 358/86, 901; 250/551; 350/96.16; 370/1, 3; 307/311

[56] References Cited

U.S. PATENT DOCUMENTS

| | | | |
|---|---|---|---|
| 3,999,837 | 12/1976 | Bowen et al. | 350/96 C |
| 4,120,554 | 10/1978 | Bianchi et al. | 339/97 R |
| 4,135,202 | 1/1979 | Cutler | 455/612 |
| 4,186,996 | 2/1980 | Bowen et al. | 350/96.20 |
| 4,234,968 | 11/1980 | Singh | 350/96.16 |

OTHER PUBLICATIONS

I. D. Judd et al., "Bidirectional Optical Isolator" IBM Tech. Disclosure Bulletin, vol. 22, No. 4 Sep. 1979 pp. 1671-1672.

Primary Examiner—Marc E. Bookbinder
Assistant Examiner—Edward L. Coles
Attorney, Agent, or Firm—Richard B. O'Planick; Adrian J. LaRue

[57] ABSTRACT

A coaxial cable/fiber optic bus network utilizes a coaxial cable for the main signal bus in a distribution system. The tap samples the electrical signal, and transforms the signal into a light pulse output. An optical splitter changes the single light output into a multiple output for serving a maximum number of peripheral units. Similarly, the input port on the tap uses a like optical splitter to recombine signal paths from the peripherals, in driving the coaxial line. Circuitry for incorporation in the tap provides a matching impedance when driving the coaxial line, and a high impedance on the line during the off-time in order to reduce line loading.

3 Claims, 9 Drawing Figures

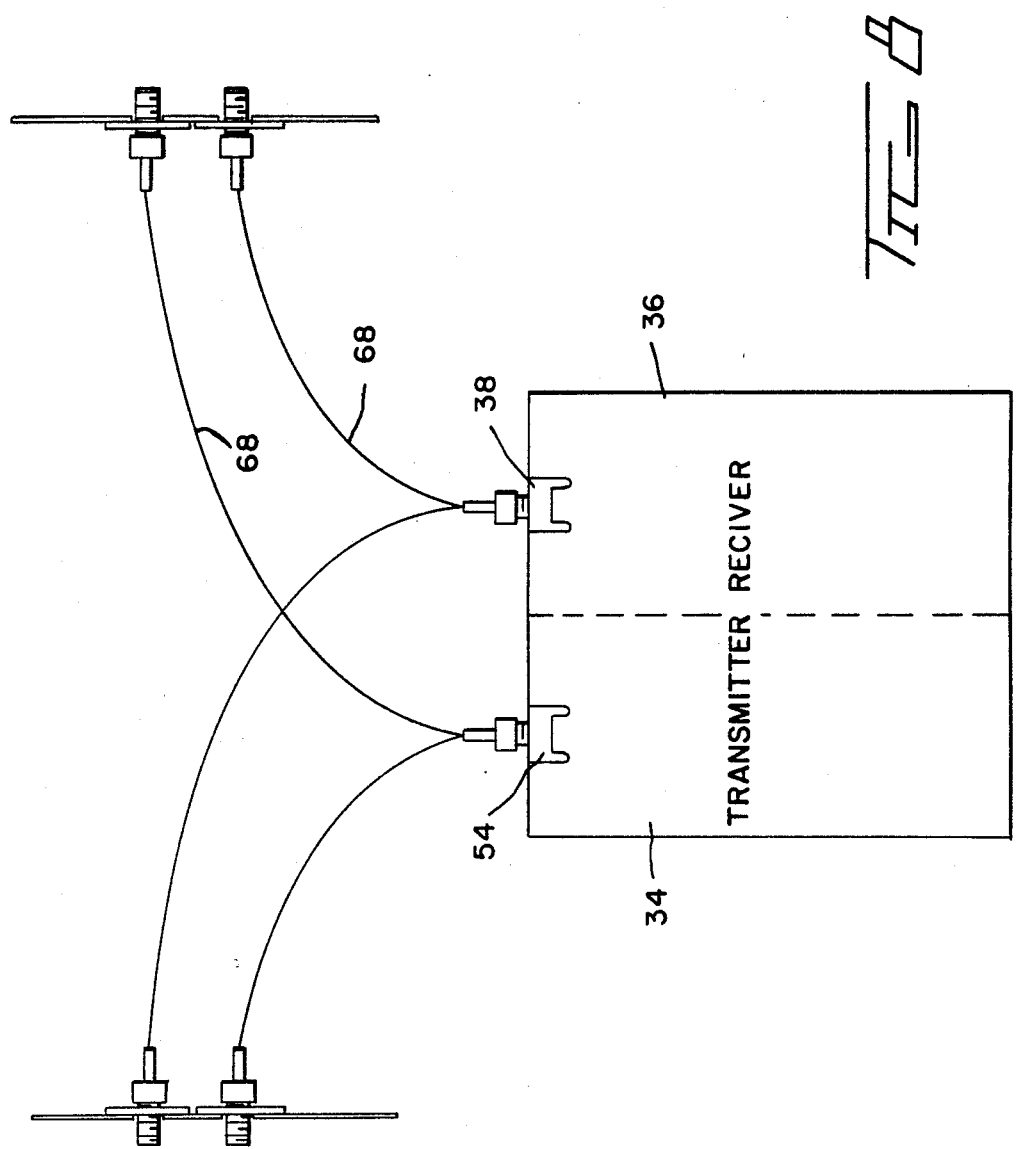

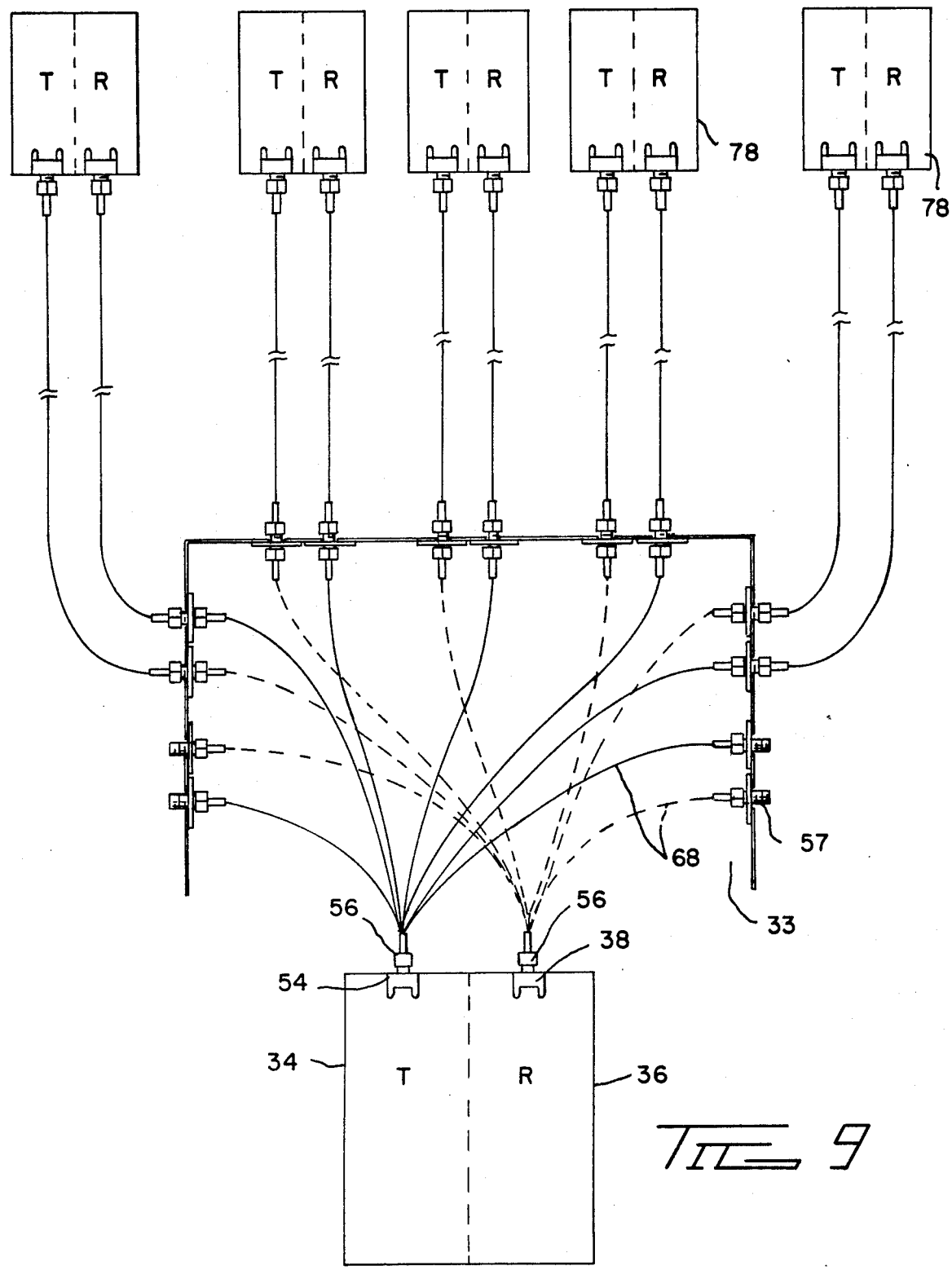

COAXIAL CABLE/FIBER OPTIC BUS NETWORK

BACKGROUND OF THE INVENTION

1. The Field of the Invention

The subject invention relates in general to a data bus system that uses coaxial type cable for signal conductors, with multiple signal ports/taps. Specifically, the invention relates to an improved data bus system, for interconnecting the maximum number of data ports to the network without using repeaters or other electronic aids.

2. The Prior Art

In many data bus systems in use today, a coaxial type cable (or other wire type cables) is used for bussing a main signal, with multiple signal ports/taps interconnected to the coaxial bus. To date, these interconnections have been achieved by terminating the coaxial cable each time a port/tap is added. The number of taps that can be used on such a system is primarily determined by the electrical effects these taps have on the signal being conducted along the signal path. The tap's electrical effects on the data signal are caused by the tap and its electronics, which load the line. Electrical effects on the data signal are further influenced by the physical configuration of the tap connection, which causes an impedance mismatch in the line.

Therefore, the number of taps that can be connected to presently available data bus systems is a relatively small number. In many applications, this number is not sufficiently large enough to meet the systems needs, and electronic devices, such as repeaters, are used along the bus in order to allow sufficient data ports to be used. Expanded use of such devices in data distribution systems add significantly to the cost, and limits the economic attractiveness of the system.

U.S. Pat. No. 4,120,554, entitled, "Coaxial Cable Connector," teaches a tap for electrically contacting with a coaxial cable, and is hereby incorporated by reference. Pursuant thereto, a connector tap is disclosed for probing the center conductor of a coaxial cable, and functions to permit electrical sampling of the main signal without requiring a termination of the cable. Such a device works well, and has been accepted by the industry. However, even with such devices, the maximum number of data ports to a bus network has heretofore been limited due to the electrical effects these taps have on the signal being conducted along the signal path. Therefore, the industry has been in need of a data bus network which would permit a sufficiently large number of data ports to be used in tapping a coaxial bus, without the use of repeaters or other electronic aids, which add cost and electronic complexities to a system, and thereby affects the systems reliability. Moreover, it would be desirable to provide electronic isolation between the main bus and the peripheral data ports.

SUMMARY OF THE PRESENT INVENTION

The present invention provides a data bus system which overcomes the above problems. A coaxial cable is utilized for the main signal bus, and the main signal bus is accessed by a plurality of taps configured according to the disclosure of U.S. Pat. No. 4,120,554. The tap samples the electrical signal, and circuitry is provided for transforming the sampled signal into a light pulse output. An optical splitter is further provided for changing the single light output into a multiple output for multiplying the number of available signal ports without adding additional electronic complexities. Likewise, the input port on the tap is adapted to utilize an optical splitter for combining signal paths from peripheral equipment, and circuitry is provided for driving a received signal along the main coaxial line.

The receiver/transmitter circuitry comprising the present invention provides matching impedance when driving the coaxial cable line to maximize power transfer, and a high impedance on the line during the off-time in order to reduce line loading. Further, pursuant to the present invention, power is bussed along the main coaxial line at relatively low frequencies, and filtering means is provided for coupling the transmitter and receiver within the tap to the data line at signal frequencies, but not at power frequencies.

Accordingly it is an object of the present invention to provide an improved data bus system.

It is a further object of the present invention to provide an improved combination data and power bus system.

Still further it is an object of the present invention to provide a bus communications network featured for achieving electrical isolation between the main data bus and peripheral ports.

A still further object of the present invention is to provide a bus communications network for digital information such that a maximum number of data ports can be interconnected to the network without requiring repeaters or other electronic aids.

Yet a further object of the present invention is to provide a bus communications network providing transmitter circuitry having matching impedance when driving the bus line, and a high impedance on the line during off-time to reduce line loading.

A further object of the present invention is to provide a bus communications network featured having means for combined bussing of power and data, and having circuitry means for coupling transmitter and receiver circuits to the data line at signal frequencies, but not power frequencies.

An object of the present invention is to provide a bus communication network comprising components which are economically and readily produced, and readily assembled.

These and other objects of the present invention, which will be apparent to one skilled in the art, are achieved by a preferred embodiment which is described in detail below and illustrated in the accompanying drawings and diagrams.

BRIEF DESCRIPTION OF THE ACCOMPANYING DRAWINGS

Figure 5:
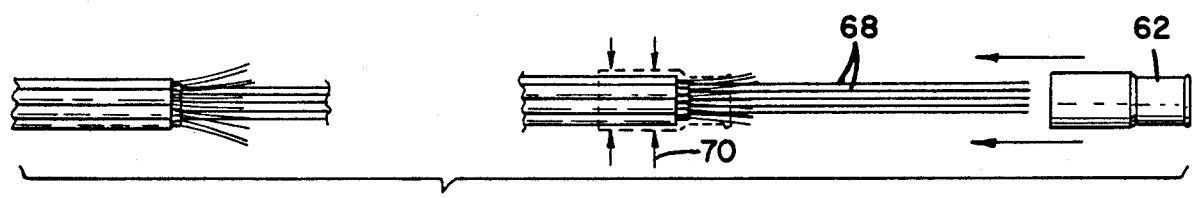
Figure 6:
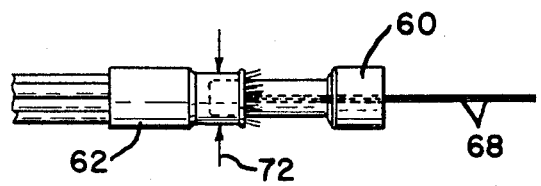
Figure 7:
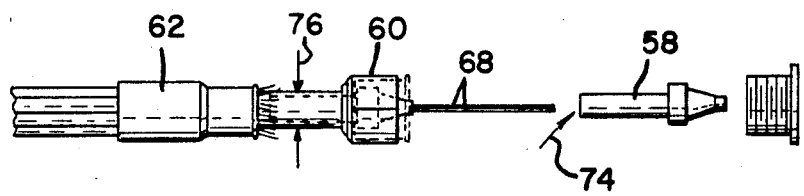

FIGS. 5, 6, and 7 are planar side elevation views illustrating in sequence the assembly of the subject optical splitter component.

FIG. 8 is a schematic representation of the transmitter and receiver components, coupled through a two fiber optical splitter.

FIG. 9 is a schematic representation of the transmitter and receiver components alternatively coupled through a seven-to-one fiber optic splitter.

DETAILED DESCRIPTION OF THE PREFERRED EMBODIMENT

Figure 1:
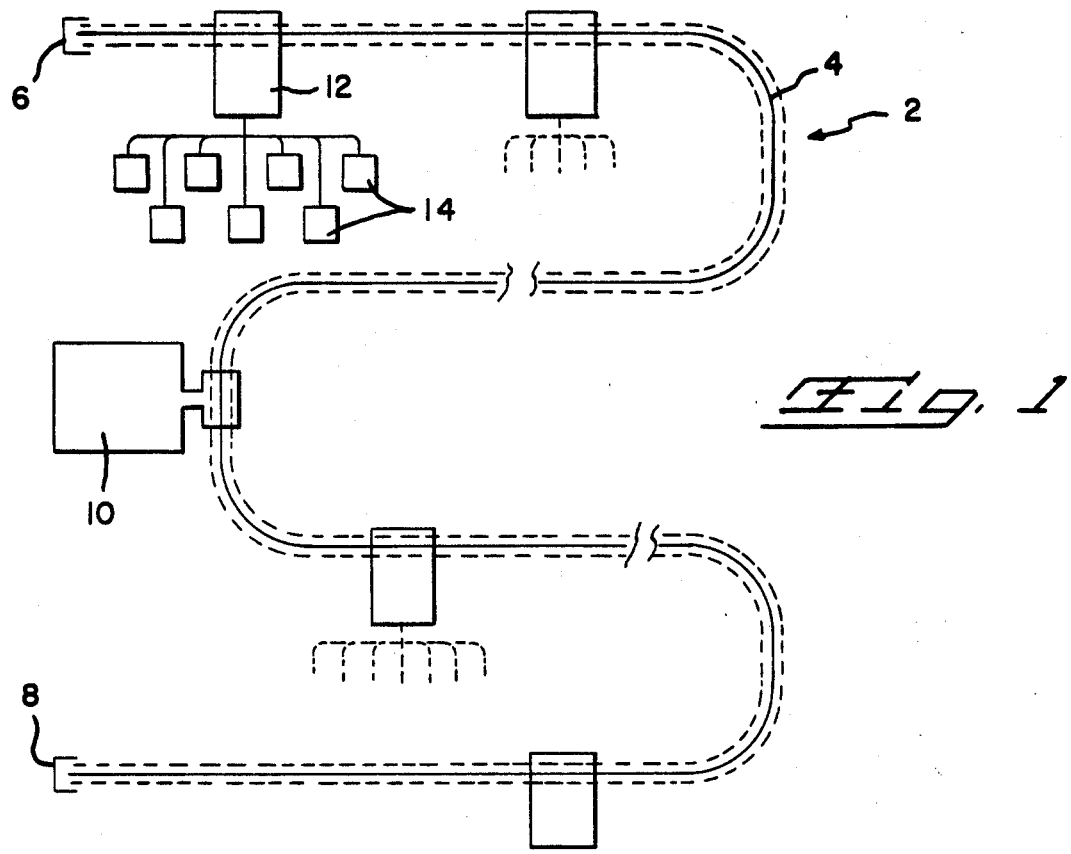
FIG. 1 is a schematic view of the subject bus communication network.

Referring to FIG. 1, the subject data bus system 2 is shown to comprise a coaxial cable line 4 terminated at opposite ends 6, 8. A network power supply 10 is provided, which powers the network through the coaxial line 4. Power supply 10 typically operates at 40 volts and 60 cycles. Continuing, the plurality of coaxial cable taps 12 are spaced along the coaxial line 4, and are configured pursuant to U.S. Pat. No. 4,120,554, incorporated herein by reference. The tap serves to contact with the main signal of the coaxial line, without requiring termination of the coaxial cable. Each tap further serves up to seven satellite ports 14, as described in greater detail below. The subject system is defined to operate at 3 megahertz, and accordingly can tolerate up to 20 taps. Beyond 20 taps, the electrical effects on the data signal, which are caused by the taps, can overload the line. Each tap is designed to pull approximately one to two watts of power from the coaxial line 4, and includes an AC to DC converting power supply for powering local transmitter/receiver circuits. It will be appreciated that the number of taps which can be tolerated on the coaxial line varies as a function of the signal frequency, the length of the cable, and the distance between taps. As stated previously, at a 3 megahertz signal frequency, it has been found that the system can tolerate up to 20 taps. While the above system voltages, frequencies, taps, etc. are preferred, other system values may be substituted as a matter of design without departing from the present invention.

Figure 2:
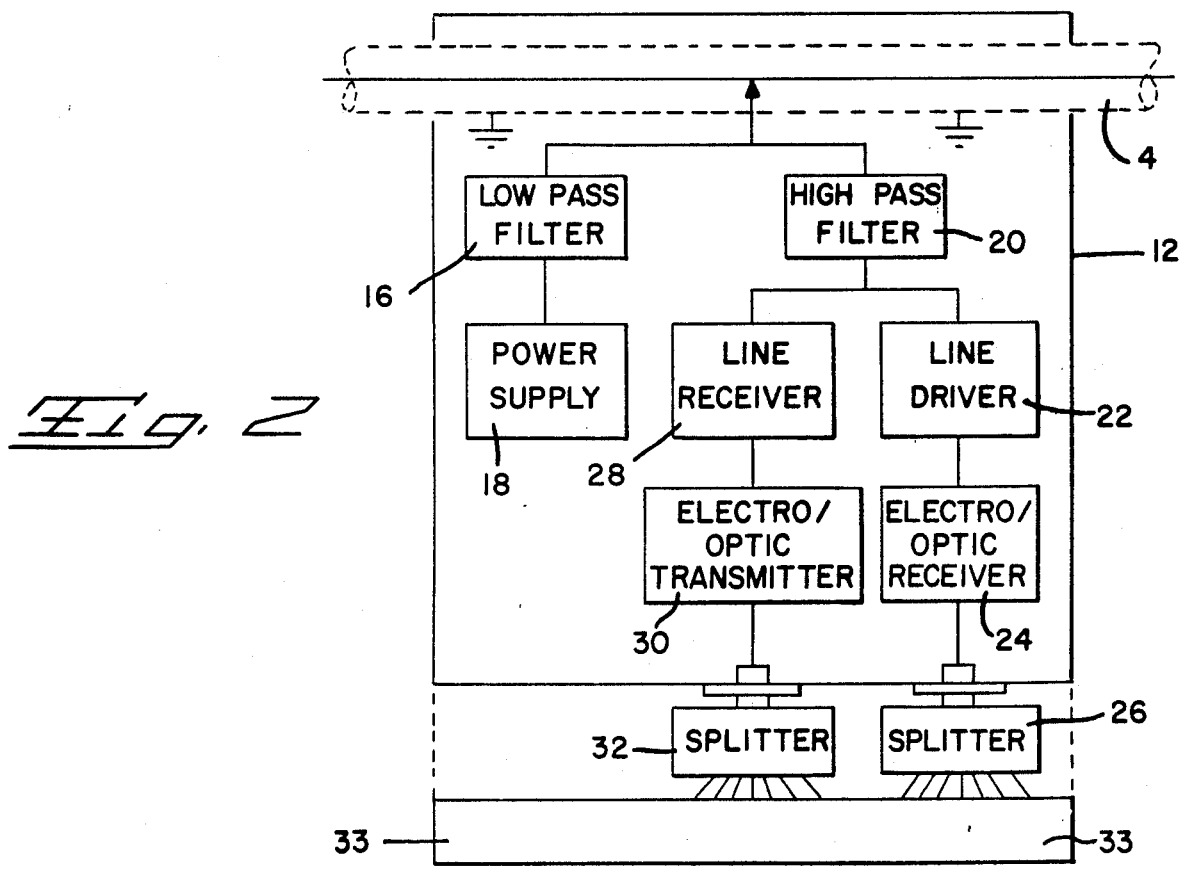
FIG. 2 is a schematic representation of the tap assembly component of the subject data bus system.

Proceeding to FIG. 2, each tap assembly 12 includes circuitry comprising a low pass filter 16 coupled to the AC to DC power supply 18, and a high pass filter 20 which services transmitter and receiver circuits. The receiver circuit comprises a line driver 22, and an electro-optic receiver 24 which is optically coupled to a splitter port 26. The transmitter circuit comprises a line receiver 28 coupled to an electro-optic transmitter 30, which is optically coupled to an output port splitter 32. A seven-to-one fiber optic terminal board, of the type illustrated in FIG. 9 is preferred, but a less than seven-to-one splitter may be used with the conjunction circuitry if so desired. The seven-to-one port fiber optic terminal board is illustrated in schematic in FIG. 2 at numeral 33, and shown further in FIG. 9.

Figure 3:
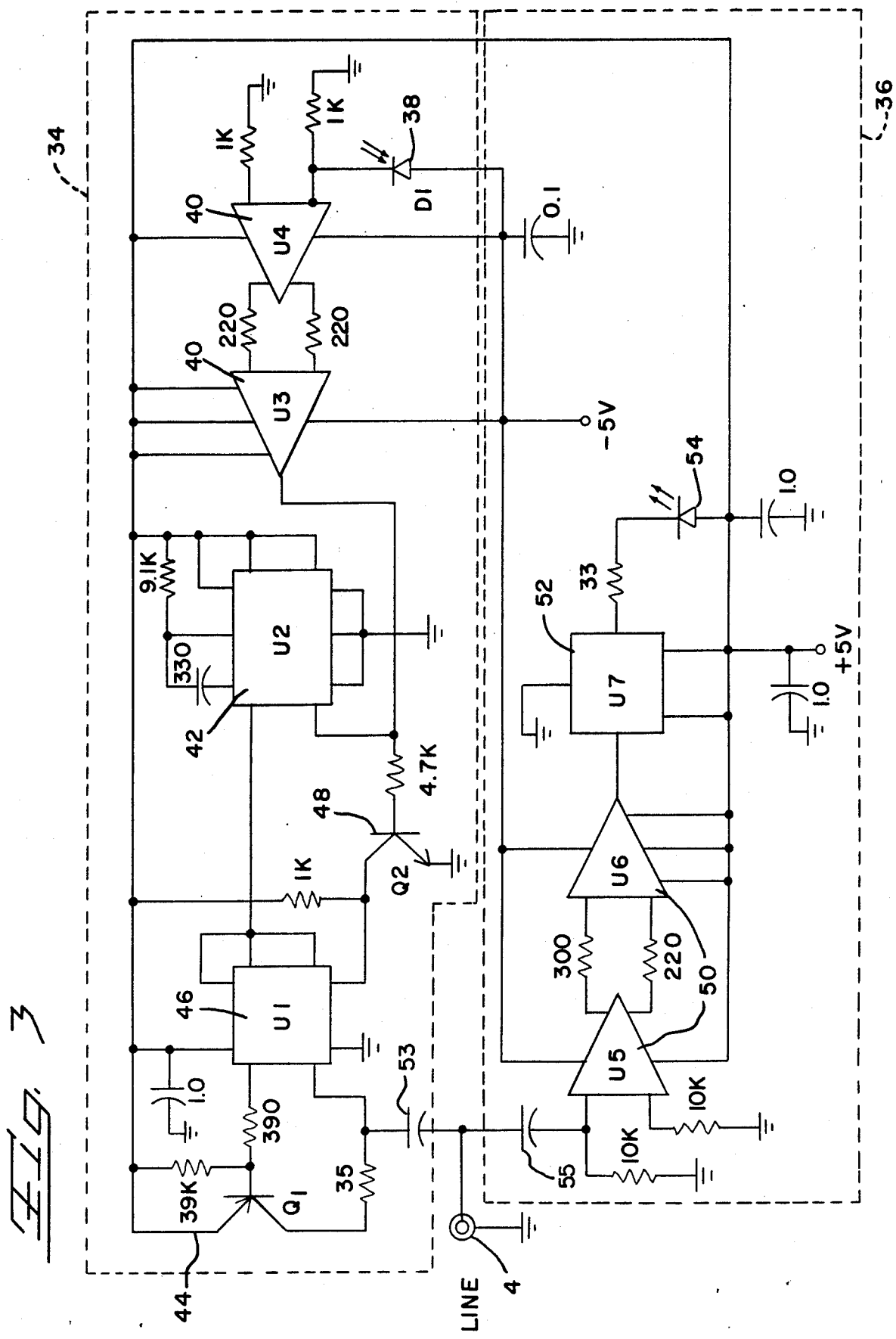
FIG. 3 is a circuit schematic view of the transmitter and receiver circuits in the subject data bus system.

Proceeding to FIG. 3, the electro-optic receiver circuit 34, and the electro-optic transmitter 36 are illustrated in circuit layouts. The receiver 34 comprises a diode detector 38 which receives optical data signals, and converts the signal to electrical current pulses, which are amplified by amplifiers 40. The first pulse functions to turn monostable 42 on, thus turning transistor 44 on, which supplies voltage to operate line driver 46. The line driver 46 functions to drive the data line 4. It will be appreciated that the monostable 42 is set to an interval greater than the maximum time between pulses within a given message. After the last pulse, the monostable times out, and turns off transistor 44. The operating voltage to line driver 46 is thus removed, disconnecting transistor 44 and the driving line driver 46 from the data line.

The transmitter circuit 36, as illustrated, comprises a pair of amplifiers 50 which are coupled to the data line 4, and a driver 52 for driving the optical diode emitter 54. Capacitors 53 and 55, couple the receiver and transmitter 34, 36, respectively, to the data line at signal frequencies, but not at power frequencies.

It will be noted from FIG. 3 that when the transmitter is on and transmitting to the data line 4, the transmitter assumes an impedance to match the impedance of the line. When not transmitting, the transmitter 44 operates as a switch to disconnect the transmitter from the data line, thereby increasing the impedance to approximate an open circuit, minimizing the loading of the data line 4.

It will be appreciated that the receiver 36, is providing a 10,000 ohm impedance to the line at all time. Due to this comparatively high impedance, the line generally does not see the receiver, and line loading is thereby minimal.

The values of capacitors 53, 55 are selected at 0.1 farads, and function to couple the respective transmitter and receiver circuits onto the data line 4 at signal frequencies, but not at the lower power frequencies.

Referring to FIG. 9, the transmitter and receiver circuits 34, 36 in each tap are provided with optical transducers 38, 54, which in turn are coupled with an optical splitter element 56. The optical splitter element 56 changes a single output or input into a multiple output. This multiplies the available number of signal ports without adding electronic complexities. Each of the seven output fibers of the splitter element 56 is distributed across the terminal board 33 to the connector interface 57 of the board. Each of the seven output fibers is therefore coupled with an optical fiber leading to a satellite transceiver 78. The physical configuration of the splitter assembly 56 and the connector interfaces 57 are illustrated in U.S. Pat. No. 3,999,837, which is hereby incorporated by reference. Specifically, with reference to FIG. 4, the splitter assembly 56 comprises a resilient, radially compressible ferrule 58, a metal retaining assembly 60, a metal ferrule 62, and a heat shrinkable outer tubing 64. The co-terminated pigtail cables are illustrated and total seven in number.

Figure 4:
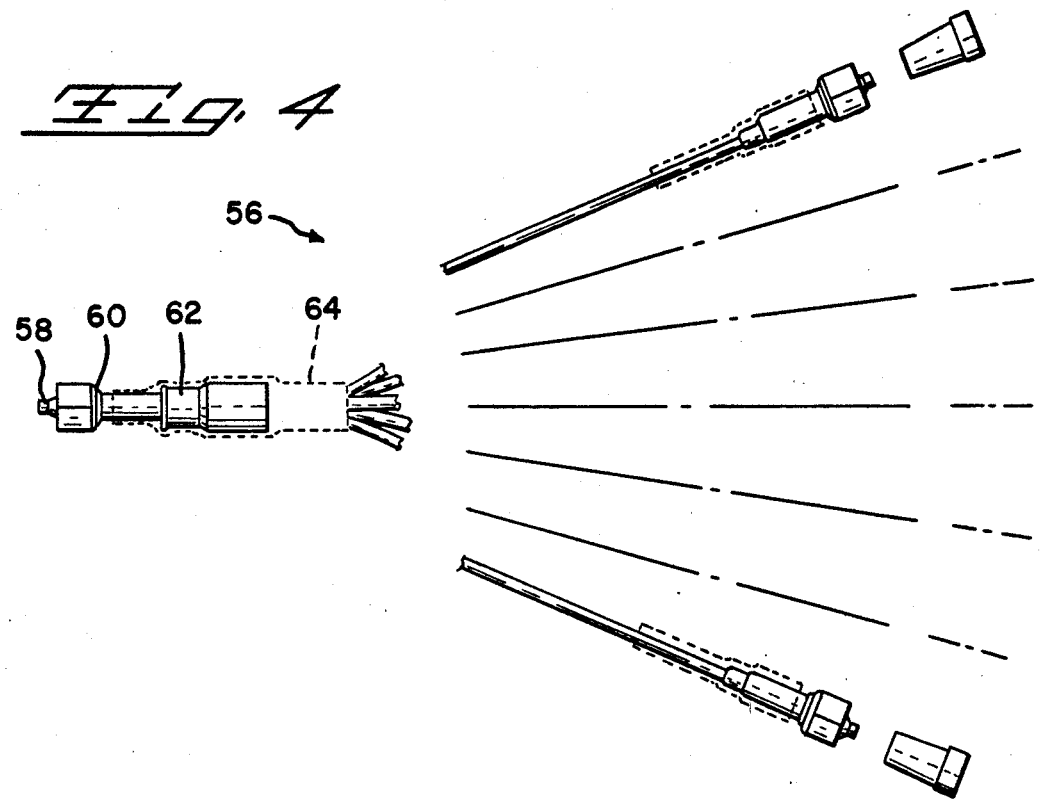
FIG. 4 is a planar view of the electro-optic, seven-to-one fiber splitter assembly, of the subject data buss system.

Referring in sequence to FIGS. 4, 5, and 6, seven optical fibers 68 are first extended through a heat shrinkable tubing 64, then the tubular metal ferrule 62, and the metal retaining assembly 60. The metal retaining assembly 60 includes a rearward portion which is received within the forward end of the metal ferrule 62. As best viewed in FIG. 5, the ferrule 62 is crimped to the cable as shown at 70, and the metal retaining assembly 60 is attached to the ferrule 62 by means of a secondary crimp 72. Thereafter, as shown in FIG. 7, the axial bore of the resilient ferrule 58 is filled with epoxy 74, and forward ends of the optical fibers 68 are projected through the ferrule bore as shown. The resilient ferrule 58 is positioned within the retaining assembly 60, and is secured therein by means of a further crimp 76. Upon the curing of epoxy 74, the forward ends of fibers 68 are polished back flush with the forward end of the ferrule 58. Thus, the seven optical fibers 68 are co-terminated into a single resilient ferrule 58, which can be coupled to either the optical emitter and detector 54, 38, as shown in FIG. 9. The opposite ends of the optical fibers 68 can likewise be terminated into a respective connector assembly as taught by pre-identified and incorporated U.S. Pat. No. 3,999,837, and interconnected with distribution fibers which proceed to remote peripheral transceiver ports 78.

It will be appreciated that the distribution of fibers 68 as viewed in FIG. 9, can be incorporated onto a fiber optic terminal board to be housed within the tap in conjunction with the transmitter and receiver circuit boards. Also, by interconnecting the peripheral transceiver 78, to the tap circuitry by optical paths, the peripheral ports are electrically isolated from the main bus. Further, the number of available signal ports is multiplied by operation of the splitter elements 56, without the addition of electronic complexities.

Still further, by using a seven-to-one optical splitter 56, the maximum of 20 taps on the coaxial cable line can effectively interconnect up to 140 data ports to the network.

It will be appreciated that while the splitter 56 is depicted as being proximately located to the tap, the splitter could also be removed to a location proximate the cluster of peripheral machines. Then, only one fiber would depart from the tap transceiver board to a location proximate the peripheral cluster, where the one optical line would be split in the manner set forth above. Optical cable required could thereby be reduced.

It is to be understood that the above described preferred embodiment of the present invention is merely illustrative. Other embodiments, which will become apparent to one skilled in the art, and which utilize the teachings herein set forth, are intended to be within the scope and spirit of the subject invention.

What is claimed is:

1. A network system for distributing digital information comprising:
   a coaxial line for bussing a main data signal at relatively high frequencies and bussing power at relatively low frequencies;
   at least one tap means for electrically interfacing with said coaxial line, comprising:
   a. receiving means for sampling said main signal, said receiving means including transducing means for transforming said sampled main signal into a light signal for output, and optical splitting means for changing said light signal output into a multiple output for distribution to multiple peripheral machines;
   b. driving means including optical transducing means for changing light signal inputs from said multiple peripheral machines into an electrical input signals, and means for driving a signal along said coaxial line in response to said electrical input signals, and switching means for connecting and disconnecting said driving means from said coaxial line; and
   c. conversion means responsive to said power frequencies for supplying operating power to said receiving and driver means.

2. A network system as set forth in claim 1, said tap means further comprising filter means for coupling in said driver and receiving means at said signal frequencies.

3. A network as set forth in claim 1, wherein said tap means has a relatively high impedance on said coaxial line during an off-time to reduce line loading.

* * * * *